(12) United States Patent
Nimerovskiy

(10) Patent No.: US 8,122,817 B2
(45) Date of Patent: Feb. 28, 2012

(54) ROTISSERIE ROTO-ROBOT KIT FOR PROGRAMMABLE SKEWER ROTATION

(76) Inventor: Ilia Nimerovskiy, Pierrefonds (CA)

( * ) Notice: Subject to any disclaimer, the term of this patent is extended or adjusted under 35 U.S.C. 154(b) by 505 days.

(21) Appl. No.: 12/371,953

(22) Filed: Feb. 17, 2009

(65) Prior Publication Data

US 2010/0122630 A1    May 20, 2010

Related U.S. Application Data

(60) Provisional application No. 61/199,617, filed on Nov. 19, 2008.

(51) Int. Cl.
*A47J 37/07* (2006.01)
*A47J 37/04* (2006.01)

(52) U.S. Cl. ........................ 99/421 H; 99/420

(58) Field of Classification Search ............ 99/419, 99/421 H, 421 HH, 421 HV, 421 P, 421 R; 126/19 R, 25 A, 25 AA
See application file for complete search history.

(56) References Cited

U.S. PATENT DOCUMENTS

| | | | |
|---|---|---|---|
| 1,738,328 A * | 12/1929 | Spielman | 99/421 H |
| 2,655,096 A * | 10/1953 | Ebin | 99/420 |
| 5,172,628 A * | 12/1992 | Pillsbury et al. | 99/421 H |
| 5,471,915 A * | 12/1995 | Lopata | 99/421 H |
| 5,715,744 A * | 2/1998 | Coutant | 99/421 H |
| 5,720,217 A * | 2/1998 | Pappas | 99/421 H |
| 5,974,956 A * | 11/1999 | McConnell | 99/421 H |
| 7,222,564 B2 * | 5/2007 | Sekiya | 99/421 P |
| 7,241,977 B2 * | 7/2007 | Friedl et al. | 219/411 |

* cited by examiner

*Primary Examiner* — Kien Nguyen

(57) ABSTRACT

A cooking apparatus for programmable rotating rotisserie skewers includes an electromotor-driven and manually-driven gearboxes comprising linearly-positioned and sequentially-engaged drive gears, a frame with openings in which skewers is rotating, wherein each skewer is equipped with a gear that rests on a top of an individual drive gear and engaged to it by food and skewer weight; so skewers can be individually removed and turned for food position adjustment. The electromotor is connected to the electromotor-driven gearbox via safety clutch disengaging said motor when manual rotation is performed or in the case of mechanical failure. To perform programmable food processing of different kind of food including symmetric food, such as souvlaki, shashlik, shish kabobs, etc. and asymmetric or flat food, such as a chicken, burger or steak, a timing mechanism periodically slowing or stopping skewers rotation for a preset pause is utilized.

8 Claims, 5 Drawing Sheets

ROTISSERIE ROTO-ROBOT KIT FOR PROGRAMMABLE SKEWER ROTATION

CROSS-REFERENCE TO RELATED APPLICATIONS

Figure 1:
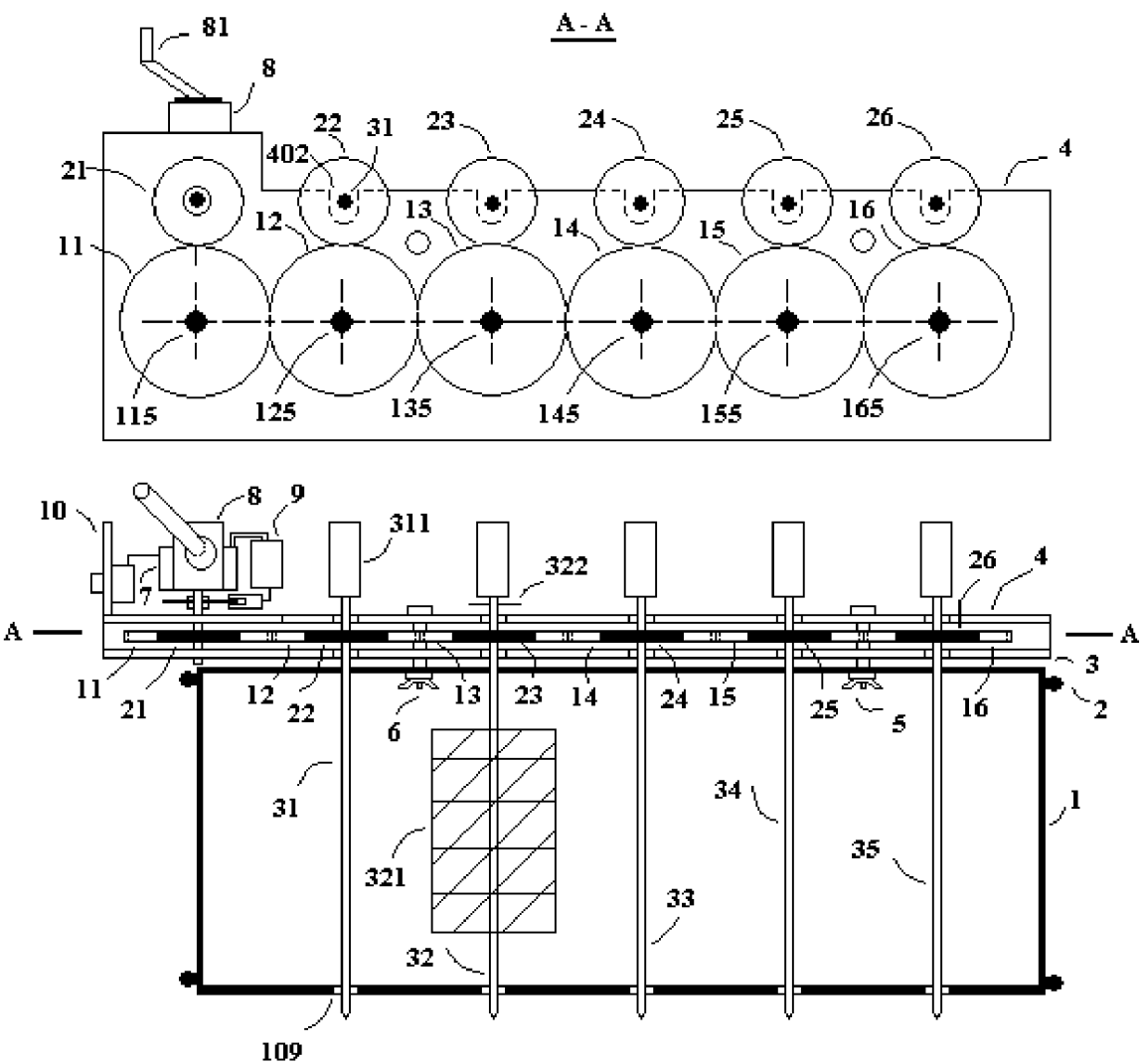

This application is Non-Provisional one of U.S. Provisional Application No. 61/199,617.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATED-BY-REFERENCE OF MATERIAL SUBMITTED ON A COMPACT DISK

Not Applicable.

FIELD OF THE INVENTION

This invention relates to a cooking apparatus and more particularly to rotisserie cooking apparatus, which provides automatic rotation of skewers.

BACKGROUND OF THE INVENTION

It is conventional to prepare uncooked food, such as meet, fish, vegetables, etc. on manually-rotated skewer blades, but it is not convenient way for skewering because a cook has to carefully and periodically rotate the skewers. Moreover, it frequently happens that the food is not evenly cooked because all portions of food are not equally heated.

There a number of rotisserie apparatus of the prior art in which authors utilize mechanical devices, such as electromotor-driven gearboxes, wherein each skewer is mechanically attached to its individual gear. Examples of such apparatus are described in U.S. Pat. Nos. 3,442,202, 3,939,761, 4,154,154 and Canadian Patent No 2,070218. The rotisserie apparatuses, which are described in these patents, utilize a gearbox comprising a number of drive gears, wherein each drive gear is attached and exclusively dedicated to an individual skewer.

U.S. Pat. No. 3,442,202 describes the rotisserie apparatus having gearbox powered by an electromotor and containing linearly-positioned gear wheels sequentially transmitting rotation, therefore continuously rotating attached skewers.

The rotisserie apparatus depicted in U.S. Pat. No. 5,001,971 also utilizes an electromotor-driven gearbox providing some additional features, but having complicated design that is not suitable for ordinary BBQ or grill.

U.S. Pat. No. 3,939,761 describes the rotisserie apparatus powered by an electromotor and utilizing a drive chain for skewer rotation.

U.S. Pat. Nos. 4,154,154 and 5,715,744 describe the rotisserie apparatuses having gearbox powered by an electromotor and containing worm screw engaged with a number of gear wheels, wherein each gear wheel is connected to an individual skewer, therefore continuously rotating the skewers.

The rotisserie apparatus described in Canadian Patent No 2,070218 has the design similar to one utilized in U.S. Pat. No. 3,442,202. Unlike the apparatus of U.S. Pat. No. 3,442,202, it is a separate unit mounted atop a grill or BBQ.

Despite of advantage of skewer mechanical rotation, features of rotisserie apparatuses of the prior art are not satisfy to common cooking requirements, such as evenly cooking all parts and pieces of food.

To properly prepare food, so avoiding burning and undercooking, the programmable timer is required.

In the majority of cases, it is asymmetric position of food on the skewer. Therefore, if the skewer is continuously rotating with constant rotational speed, different parts of the food become unevenly cooked.

When pieces of food placed on different skewers have different size, shape and weight, rotisserie apparatuses, in which all skewers rotate with the same rotational speed, can not cook evenly all pieces of the food.

Sometimes in the process of skewing, it is necessary to manually turn (adjust) position of the skewer. If the skewers are firmly attached to drive gears, manual rotating of the skewers becomes impossible.

Also, the apparatus simplicity and its cost-efficiency are essential.

OBJECT OF THE INVENTION

It is an object of the present invention to offer a novel universal and cost-effective rotisserie apparatus providing programmable automatic skewers rotation, which allows evenly and properly cooking all kinds of food, such as meet, fish and vegetables, and, also, asymmetric food, such as chicken, burger, steak, etc., without overcooked or undercooked situation.

SUMMARY OF THE INVENTION

The present invention alleviates the disadvantages of the prior art by utilization of manual and electromotor-driven gearboxes comprising drive gears and idler gears attached to skewers and sitting atop the drive gears. Such solution together with a skewer position switch and programmable timer makes the rotisserie apparatus—the object of the present invention—completely programmable; therefore, said apparatus reflects all cooking requirements essential for preparation of different kinds of food. A safety clutch incorporated in the rotisserie apparatus—the object of the present invention—allows manual rotating and, also, protects the apparatus from mechanical failure.

THE DRAWINGS

Figure 2:
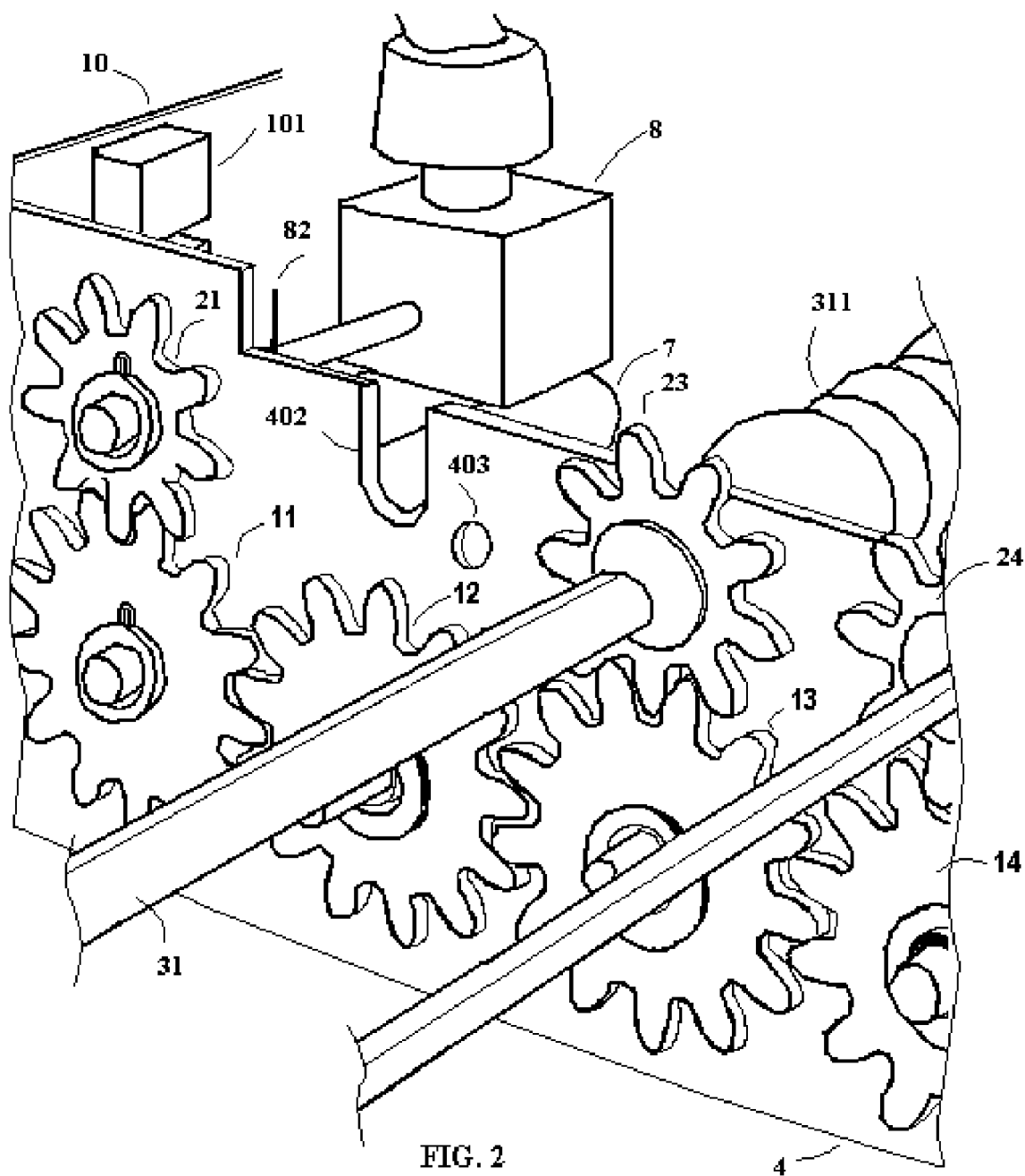
Figure 3:
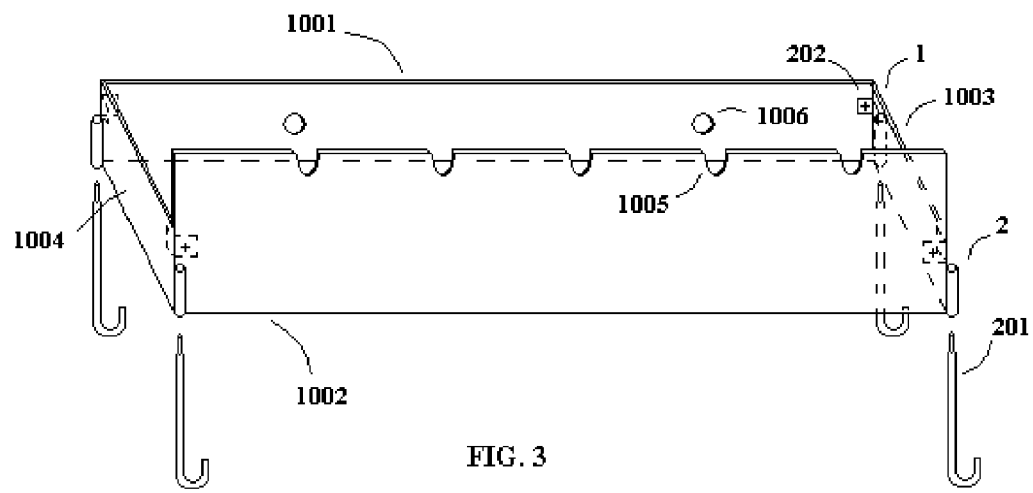
Figure 4:
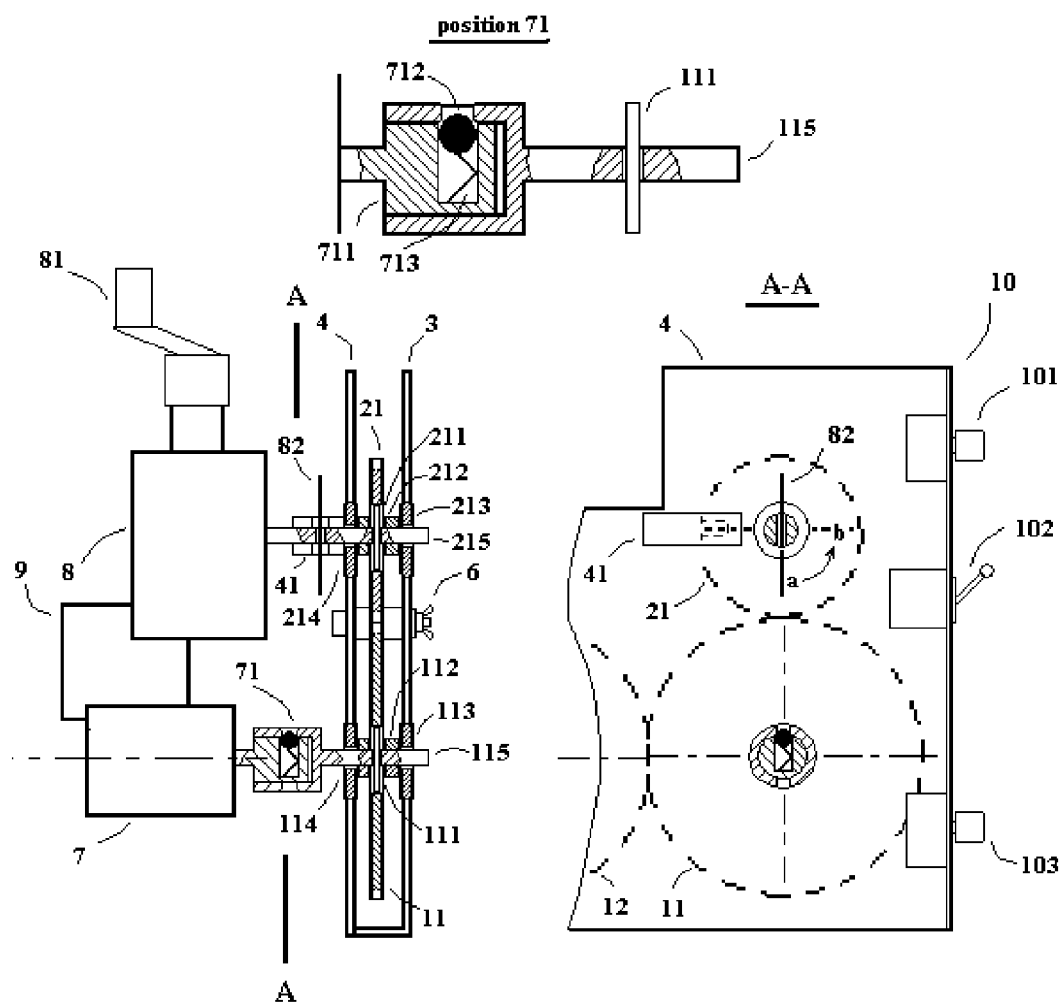
Figure 5:
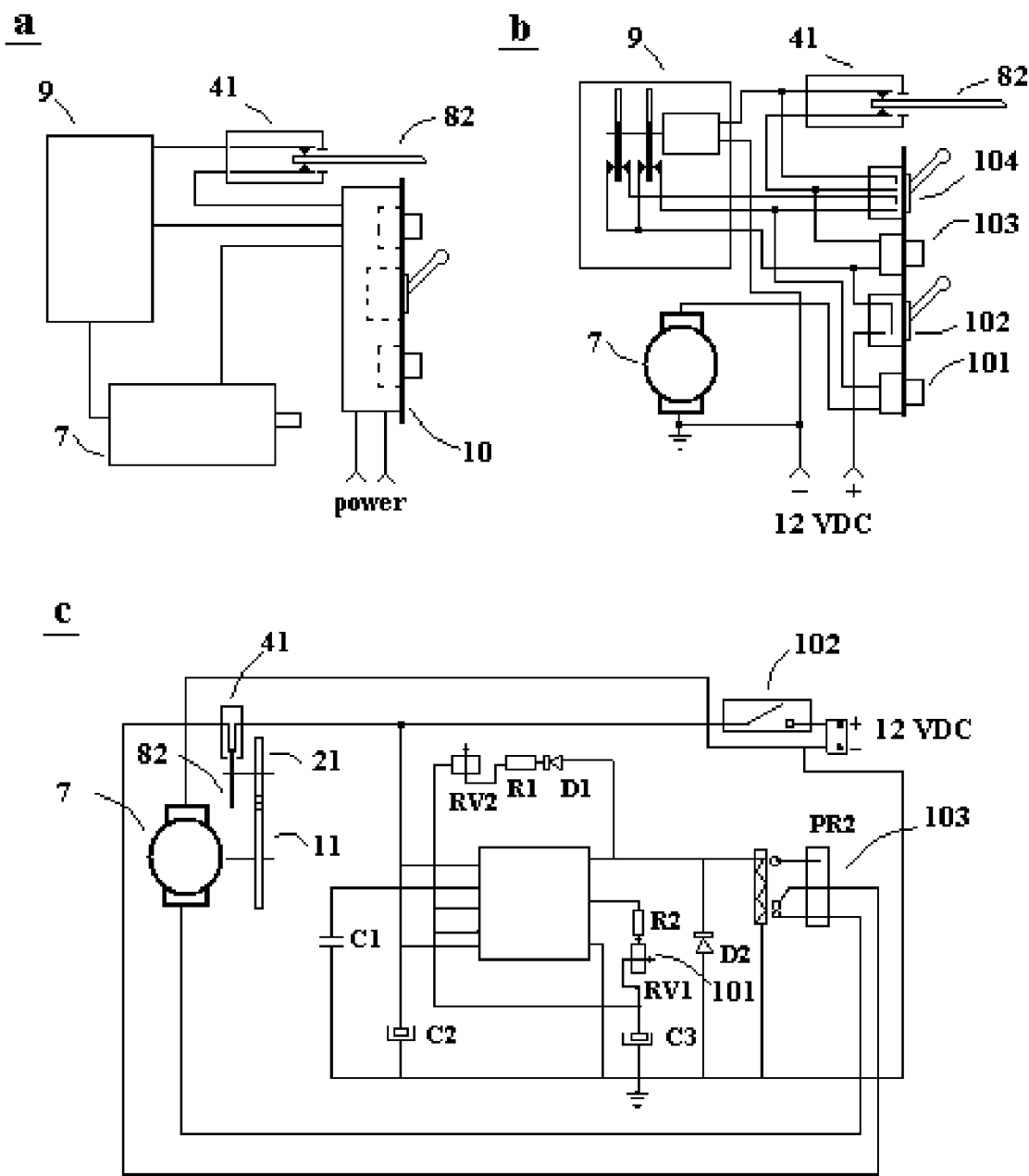
Figure 6:
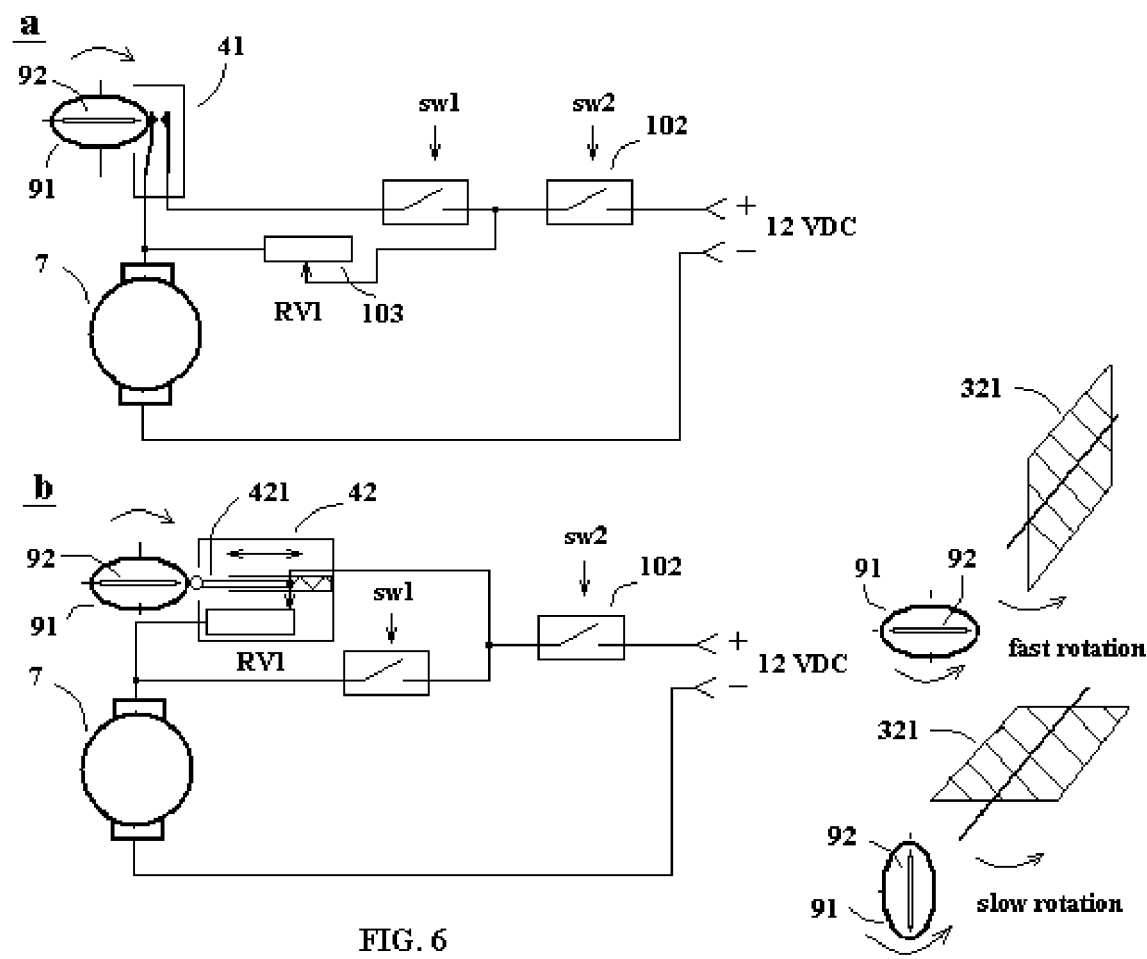

FIG. 1 represents the general view of the apparatus.
FIG. 2 depicts the gearbox in details.
FIG. 3 depicts the frame.
FIG. 4 depicts the driving mechanism.
FIG. 5 represents variants of electrical block diagram and wiring of the apparatus.
FIG. 6 represents other variants of wiring of the apparatus.

DETAILED DESCRIPTION OF THE PREFERRED EMBODIMENTS OF THE PRESENT INVENTION

The rotisserie apparatus of the present invention can be configured as depicted in FIGS. 1, 2, 3 and 4. The apparatus incorporates a detachable free-standing frame 1 for resting atop a grill (BBQ, campfire, etc.), a first gearbox comprising laterally-spaced and sequentially-engaged drive gears 11-16, on a top of which idler gears 21-26 with attached skewers 31-35 are freely resting. The first gearbox is mounted in a frame consisting of frame members 3 and 4.

Said first gearbox is driven by an electromotor 7 connected to the drive gear 11 via a coupling 71 (see FIG. 4); also it can be driven manually by a second gearbox 8. In this case, said coupling 71 works as a safety clutch disengaging the electromotor 7 from shaft 115. The coupling 71 also protects the electromotor and gearbox in the case of mechanical problems, such as gear clinch. Shafts 115 and 215 transmit rotation to gears 21 and 11 by means of pins 111 and 211 coupled with said shafts; wherein the gears 11 and 21 is supported by bearings 113, 114 and 213, 214. The gears 12-16 are freely rotating on shafts 125-165.

To support the skewers and provide its rotation ability, the members 3 and 4 of the gearbox frame and wall 1002 of detachable frame 1 comprise a plurality of laterally spaced apart aligned openings 402 and 1005, in which the skewers 31-35 freely rest; so the gears 12-16 transmit rotation to gears 22-26 so rotating said skewers in said openings, wherein the gears 12-16 are kept engaged to gears 22-26 by food and skewer weight. Because of this solution, the gears 22-26 may have different number of teeth; so skewers can rotate with different speed. It is important in the case when the skewers hold dissimilar kinds of food, wherein each of them requires individual cooking procedure.

The scheme of the frame 1 is depicted in FIG. 3. It comprises members—walls 1001,1002, 1003 and 1004 that are combined in the frame by set of brackets 202 and attached to gearbox by screws 5 and 6 via opening 1006, wherein the wall 1002 has a number of openings 1005 in which the skewers rotate. The rotisserie apparatus can be mounted atop a grill, BBQ or campfire by means of set of attachable legs 201 and nuts 2, wherein each nut 2 is firmly fastened to frame members as depicted in FIG. 3.

The apparatus is controlled automatically by a timing mechanism 9 and a control panel 10 containing knobs 101, 103 and a power switch 102. For preparation of a flat food, such as burgers and steaks, a rotisserie skewer 32 is equipped with steak holder 321. To control position of food, a rotating pin 82 (or cam 91 on FIG. 6) coupled with shaft 215 is used. Said pin 82 (or cam 91) periodically switches on the timing mechanism 9 by means of a contact switch 41 so stopping skewer rotation for a pre-installed time gap and, after it, resuming rotation again, wherein the knob 101 controls rotational speed of the skewers and knob 103 sets the time gap.

Variants of electrical scheme of the apparatus are depicted in FIGS. 5*a*, *b* and *c*, wherein the block-diagram is depicted in FIG. 5*a*. It contains electromotor 7, timing mechanism 9, switch 41 and controlling panel 10. The timing mechanism 9 together with switch 41 allows making pauses in skewer rotation, which is important in the process of traditional preparation of flat food, such as burger, steak, etc. In this case, the rod 81 coupled with shaft 215 periodically closes contacts of switch 41 so starting the timing mechanism 9. When the timing mechanism 9 starts it disconnects contacts feeding the main electromotor 7 so stopping skewers for the time gap, which is preset by knob 103. Previously, the skewer 32 holding food has to be turn in such a way that time of skewer stopping is synchronized with horizontal position of said steak. To recognize this horizontal position, the flag 322 attached to the skewer 32 is used.

The embodiment of the electrical scheme utilizing electromechanical timing mechanism is depicted in FIG. 5*b*. Here switch 104 allows changing operational modes of the apparatus from continuous skewer rotation to periodical stopping. Therefore, when the switch 104 is closed, the apparatus works in continuous-skewer-rotation mode with preset cooking time. When the switch 104 is opened, the apparatus works in periodically-stopping mode with preset pause.

Another embodiment of the electrical scheme utilizing electronic timer is depicted in FIG. 5*c*. Here the time gap and rotational speed of the motor 7 are controlled by variable resistors RV1 (knob 103) and PR2 (knob 101 ) respectively.

Other embodiments of the electrical scheme utilizing electromechanical speed regulator are depicted in FIGS. 6*a* and *b*. In these embodiments the electromotor 7 does not completely stop, rather it stills rotating, but with variable speed that depends on position of skewers. Another embodiment of the electrical scheme is shown on FIG. 6*a*, Here, a detachable specially-profiled cam 91 coupled with shaft 215 periodically closes contacts 41 so applying full voltage to electromotor 7; therefore, electromotor 7 rotates with maximal speed. When contacts 41 are opened the current feeds the electromotor 7 via variable resistor 101; so the electromotor rotates slowly. While its rotation the cam 91 holds contacts 41 closed for a period of time, which depends on shape of the cam. Thus, asymmetric food gets heat that allows evenly cooking such food. Shape of the cam 91 can be customized for different kinds of food, such as steak, burger, chicken, etc. The sign 92 attached to the cam 91 shows position of skewers in which they rotate with maximal or minimal speed. In the case of preparation of symmetric food, such as souvlaki, shashlik, shish kabobs, etc., the cam 91 is detached; and the motor 7 rotates with constant speed controlled by variable resistor 101.

The variant of this embodiment utilizing a cam-controlled variable resistor 92 instead of switch 41 is depicted in FIG. 6*b*. Here, a detachable specially-profiled cam 91 is engaged with movable rod 421 of variable resistor 42. Rotating, the cam 91 pushes rod 421 that is mechanically connected to movable contact of variable resistor 42;

therefore, the resistor 42 changes current feeding the motor 7 in accordance with the profile of the cam 91. In the result, the motor 7 programmable varies its speed that allows evenly cooking any kind of food. The profile of cam 91 can be customized for different kinds of asymmetric food, such as steak, burger, chicken, etc. Timing mechanism of this embodiment can be also used for preparation of any symmetric food, such as souvlaki, shashlik, shish kabobs, etc. In the case of preparation of such symmetric food, the cam 91 has disk shape and rotates about its center. Therefore, the motor 7 rotates with constant speed controlled by variable resistor 42.

The rotisserie apparatus of the present invention works in two modes:

continuous-skewer-rotation mode with constant rotational speed, periodically-stopping mode, continuous-skewer-rotation mode with variable rotational speed.

The first mode is used when pierced food is symmetric one, such as shashlik, etc. In this case, the apparatus works as follows:

When power switch 102 is on electromotor 7 starts rotating. Rotation is transmitted to drive gear 11 via coupling 71. The gear 11 transmits rotation to sequentially-positioned gears 12-16, which rotate idle gears 22-26 and attached to them skewers 31-35. Therefore, the skewers with pierced food start rotating. The rotational speed is controlled by knob 101 (see FIG. 5). When the switch 102 is off, the electromotor 7 stops, so stopping the skewers. Because the skewers 31-35 with gears 22-26 are freely resting atop gears 12-16, it is possible to take off any skewers, manually turn it and put it back without disturbing rotation of other skewers.

The second and third modes are used when pierced food is asymmetric or flat one, such as steak, burger, etc. In this case, the apparatus works as follows:

When power switch 102 is on electromotor 7 starts; so it starts rotating the skewers with pierced (or hold in special grasp 321) food. When the skewer turns food in the position requiring continuous heating, the switch 42 and timing mechanism 9 stop or slow down skewer rotation for a pre-set pause, which allows evenly cooking the food. Therefore, the flat surfaces of steak or burger receive heat that is necessary for proper cooking.

The apparatus of the present invention is universal one that can be mounted on a top of a food preparation apparatus. It can be easily assembled and disassembled and utilized not only on a backyard (gas or charcoal grill or BBQ), but also on a camping (campfire), wherein the electromotor 7 is powered by 12 VDC battery. Optionally, the electromotor 7 can be fed by 110 VAC in the case when the apparatus is used on a backyard or on a site where 110 VAC connections is available.

What is claimed is:

1. Rotisserie cooking apparatus comprising:
   a. a frame for resting atop a grill containing a front frame member, a rear frame member spaced apart front said front frame member, wherein said frames comprise a plurality of laterally spaced apart aligned openings where a plurality of laterally spaced apart rotatable skewers having a blade and a handle are installed;
   b. a gearbox mounted on said rear frame member that includes a electromotor-driven plurality of sequentially engaged gears, wherein each individual gear is coupled to single skewer and a driving motor is connected to a single drive gear of said gearbox via a driving shaft; so said gearbox transmits rotation to said skewers;
   c. a on/off power switch;
wherein improvement comprises:
said skewers equipped with skewer's gears that are firmly attached to said skewers, wherein said skewers freely rest in said openings and each of said skewer's gears is engaged to individual gear of said gearbox by weight of said skewer and food carried on said skewer;
therefore, rotation is transmitted to each individual skewer via said gearbox, wherein each skewer's gear has the same or different number of teeth that allows said skewers rotating with the same or different speed.

2. The cooking apparatus of claim 1 additionally comprising a manually-driven second gearbox engaged to the drive gear by means of an additional gear having the same number of teeth as the skewer's gear, which is sitting on a top of said drive gear and connected to said second gearbox by means of a second shaft, wherein the driving shaft additionally comprises a safety clutch disengaging the driving motor when said manually-driven gearbox is in use or in the case of mechanical problems, such as gear clinch.

3. The cooking apparatus of claim 2 additionally comprising a programmable timer electrically connected to the driving motor, which starts and stops said motor according to a pre-set time sequence.

4. The cooking apparatus of claim 3 additionally comprising a two-contact switch that is firmly fastened on the rear frame member and activated by a rod, which is attached perpendicularly to the second shaft and rotates together with the second shaft, wherein said rod periodically closes contacts of said two-contact switch so starting the timer that periodically stops the driving motor for a pre-set pause; said pause is used in a process of asymmetric food preparation to evenly prepare said asymmetric food.

5. The cooking apparatus of claim 2 additionally comprising:
   a two-contact switch having a first contact and a second contact, and which is firmly fastened on the rear frame member, wherein said first contact is electrically connected to a power supply and said second contact is electrically connected to first terminal of the electromotor, which second terminal is grounded;
   a profiled cam, which is attached to the second shaft and rotates together with the second shaft, wherein said cam periodically closes contacts of said two-contact switch for a pause that depends on profile of said cam; so full current is running in the electromotor coil which starts rotating with a maximal speed;
   a variable resistor shorting out said first and second contacts of said two-contact switch that allows the electromotor rotating slowly with variable speed controlled by said resistor when said first and second contacts of said switch are opened; therefore the electromotor rotates with maximal speed when said two-contact switch is closed by said cam, and the electromotor rotates with slow speed controlled by said variable resistor when said two-contact switch is opened;
   a sign attached to said cam that indicate fast-rotating and slow-rotation positions of the skewers.

6. The cooking apparatus of claim 5, wherein the skewer's blade is equipped with a steak holder and the skewer's handle is equipped with a sign indicating horizontal position of said steak holder about surface of a furnace; therefore, when said sign and the sign attached to the cam that indicates fast-rotating and slow-rotation positions of the skewers are aligned, maximal speed of skewer rotation is achieved to avoid burning of steak's ends when said steak holder is in perpendicular to surface of a furnace.

7. The cooking apparatus of claim 2 additionally comprising:
   a variable resistor firmly fastened on the rear frame member that has a first connector, a second connector and a sliding contact, wherein said first connector is electrically connected to a power supply and said sliding contact is electrically connected to first terminal of the electromotor, second terminal of which is grounded; therefore, current running in the electromotor coil is controlled by said resistor;
   a rod mechanically coupled with said sliding contact of said resistor,
   a profiled cam, which is attached to the second shaft and rotates together with the second shaft,
   a spring pushing said rod to engage with said cam; therefore, rotating cam shifts said sliding contact so changing resistance of said variable resistor in accordance with profile of said cam; it allows programmable slowing and accelerating the speed of rotation of the electromotor and the skewers, which is essential in preparation of asymmetric food;
   a sign attached to said cam that indicates fast-rotating and slow-rotation positions the skewers.

8. The cooking apparatus of claim 7, wherein the skewer's blade is equipped with a steak holder and the skewer's handle is equipped with a sign indicating horizontal position of said steak holder about surface of a furnace; therefore, when said sign and the sign attached to the cam that indicates fast-rotating and slow-rotating positions of the skewers are aligned, maximal speed of skewer rotation is achieved when said steak holder is in perpendicular to surface of a furnace to avoid food burning.

* * * * *